United States Patent Office 3,709,938
Patented Jan. 9, 1973

3,709,938
2,6-DIHALO-m-SUBSTITUTED-BENZOIC ACID AMIDES
William J. Houlihan, Mountain Lakes, N.J., assignor to Sandoz-Wander, Inc., Hanover, N.J.
No Drawing. Filed Dec. 10, 1969, Ser. No. 884,011
Int. Cl. C07c 103/22
U.S. Cl. 260—558 D 7 Claims

ABSTRACT OF THE DISCLOSURE 2,6-dihalo-m-substituted-benzoic acids and acid amides, e.g., 2,6-dichloro - m - methoxybenzoic acid or 2,6 - dichloro-m-methoxy benzamide, are prepared from substituted 2,4-dihalo benzene compounds and are useful as anti-coccidial agents, herbicides and central nervous system depressants.

This application relates to novel 2,6-dihalo-m-substituted benzoic acids and acid amides, their preparation, and their use as central nervous system depressants, herbicides and coccidiostatic agents.

The compounds of this invention may be represented by the formula:

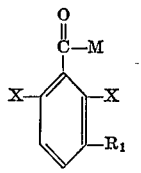

where each
X represents, independently, halo of atomic weight between about 19 to 36;
M represents —OH or

where
$R_2$ and $R_3$, independently, represent hydrogen or lower alkyl, i.e., alkyl having 1 to 4 carbon atoms, e.g., methyl, ethyl, isopropyl, etc.; and
$R_1$ represents lower alkyl; lower alkoxy, i.e., alkoxy having 1 to 4 carbon atoms, e.g., methoxy, ethoxy, isopropoxy, etc.; allyloxy; phenyl;

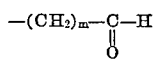

where $m$ is 0 to 3;

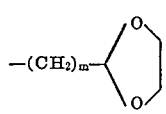

where $m$ is as defined above

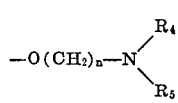

where
$n$ is 2 or 3; and $R_4$ and $R_5$, independently, represent lower alkyl; or $R_1$ represents

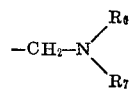

where
$R_6$ and $R_7$, independently, represent lower alkyl or $R_6$ and $R_7$ together with N represent

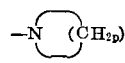

where $p$ is 4 to 6; or

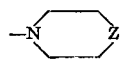

where Z is oxygen, sulfur or N—$R_4$.

The process for preparing the compounds of this invention in which M represents

where $R_2$ and $R_3$ are as described above is shown in the following reaction scheme:

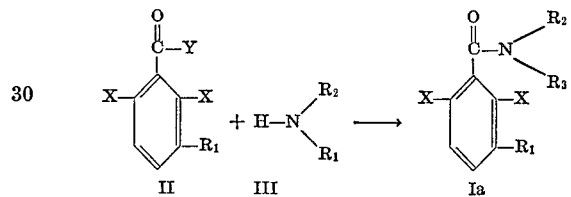

where Y represents halo having an atomic weight of about 35 to 80 and X, $R_1$, $R_2$ and $R_3$ are as defined above.

The product (Ia) is prepared by aminating an acid halide (II) with an amine (III). The reaction can be carried out in excess acid halide (II) if it is liquid, or an inert solvent can be used. The amine (III) is normally added in the form of an aqueous or inert solvent solution; but if the amine is liquid, it can be added without dilution. The preferred solvents are benzene, toluene, pentane, hexane, methylene dichloride, chloroform and the like, especially toluene and methylene dichloride. Although the temperature is not critical, the reaction is preferably carried out at temperatures between 10° and 50° C., especially 20° to 35° C. For optimum results, it is preferred that the reactions be allowed to run for about 2 to 48 hours. The final product is recovered by conventional techniques, e.g., precipitation and recrystallization.

The process for preparing the compounds of Formula I in which M is OH is illustrated by the following reaction scheme:

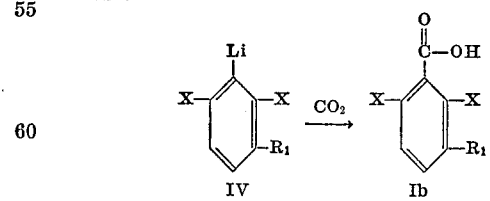

where X and $R_1$ are as defined above.

The product Ib is prepared by treating a lithium intermediate IV with carbon dioxide in an inert solvent. Although not critical, the reaction is normally carried out at a temperature of from about —50° C. to about —10° C. and preferably at a temperature of —50° C. to —25° C. The carbon dioxide used can be a solid or gas. The solvent may be a lower hydrocarbon preferably pentane, hexane, heptane and the like, ethers preferably diethyl ether, dibutyl ether and the like, tetrahydrofuran and benzene. Diethyl ether and hexane are especially preferred. The final product is recovered by conventional techniques, e.g., by recrystallization.

The present invention also encompasses the acid halide II which is prepared by acylating the acid Ib with an inorganic acid halide, e.g., $SOCl_2$, $PCl_3$, $PCl_5$, or $SOBr_2$. The reaction is illustrated in the following scheme using a thionyl halide, the preferred acylating agents:

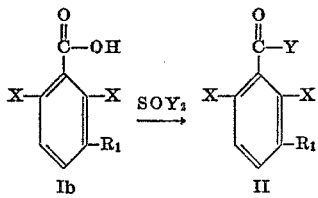

where X, Y and $R_1$ are as defined above.

The reaction is carried out in excess halogenating agent or inert solvent. The preferred inert solvents are benzene, toluene, pentane, hexane, heptane, methylene dichloride, chloroform and the like, especially toluene and methylene dichloride. Although the time and temperature of the reaction are not critical, it is preferred that the reaction be run for approximately 1 to 24 hours at a temperature between about 30° C. and 125° C., and especially at the reflux temperature of the system. The acid halide may be recovered by conventional techniques, e.g., evaporation or distillation.

The present invention further encompasses the lithium intermediates IV which are prepared in accordance with the following reaction scheme:

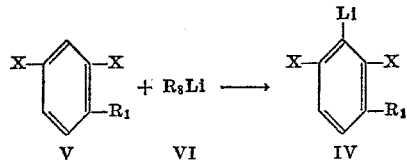

where $R_3$ is a straight chain alkyl having 1 to 6 carbon atoms, e.g., methyl, ethyl, propyl, butyl, etc.; and X and $R_1$ are as defined above.

The lithium intermediate IV is prepared by reacting the 2,6-dihalo-$R_1$ substituted-benzene V with a straight chain alkyl lithium compound VI in an inert solvent in the presence of an inert gas. The preferred alkyl lithium compound is butyl lithium. The preferred solvents are the lower hydrocarbons such as pentane, hexane, heptane and the like, ethers such as diethyl ether, dibutyl ether, and the like. Tetrahydrofuran and benzene and especially tetrahydrofuran. The inert gas may be nitrogen, helium, argon and the like. Although not critical, the reaction is generally carried out at temperatures of about −60° C. to −30° C. with the preferred temperature range being −50° C. to −40° C.

The compounds of Formula I in which $R_1$ is the acetal,

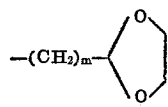

are converted to the corresponding aldehydes or vice versa, by known techniques, i.e., by treating the acetals with an acid or the aldehydes with ethylene glycol.

Compounds of Formula Ia can also form mineral acid or organic acid salts where tautomerism or the presence of a second amine group permits. For example, where $R_2$ or $R_3$ is a hydrogen, tautomerism in many cases permits salt formation. On the other hand, when $R_1$ is

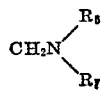

salts readily form because of the presence of a second amine group.

The compounds of Formula VI and many of the compounds of Formulas III and V are known and are prepared by methods described in the literature. The compounds of Formulas III and V which are not specifically described in the literature may be prepared by analogous methods from known materials.

The compounds of this invention can be used as herbicides at dosage levels normally employed for this purpose, that is, between 2 to 30 lbs. per acre. The preferred range is 2 to 10 lbs. per acre. For this use, the base form of the compound is generally employed.

The compounds of Formula Ia are also useful in the control of poultry coccidiosis. For this purpose, the base form can be administered in the feedstuff of the birds; or the salt form, if structurally possible, can be given in the drinking water. If desired, the compounds can be given by direct administration dissolved or suspended in a suitable solvent. In any event, only minor amounts are needed to obtain the desired anticoccidial effect. For optimum results, it is preferred that the base compounds be administered in the feed of the poultry, which is given ad libitum to the birds. Feed concentrations of from 0.005% to 0.3% preferably from 0.01% to 0.1% especially from 0.03% to 0.06%, are recommended.

The compounds of Formula Ia and the pharmaceutically acceptable acid addition salts which can be formed by some of these compounds as discussed above are also useful because they possess pharmacological activity in animals, such as mammals. In particular, the compounds are useful as central nervous system depressants, especially as tranquilizers. Their activity is indicated by the method of Orloff et al. (Proc. Soc. Exp. Biol., 70: 254, 1949) using mice in which convulsive seizures are chemically induced with strychnine and metrazol.

The compounds of Formula Ia or the salts of these compounds may be combined with a pharmaceutically acceptable carrier or adjuvant. They may be administered orally or parenterally. For this use, the dosage will vary depending upon the mode of administration utilized and the particular compound employed. However, in general, satisfactory results are obtained when the compounds are administered at a daily dosage of from about 0.4 milligrams to 150 milligrams per kilogram of animal body weight. This daily dosage is preferably given in divided doses, e.g., 2 to 4 times a day, or in sustained release form. For most large mammals, the total daily dosage is from about 30 to 1000 milligrams, and dosage forms suitable for internal administration comprise from about 7.5 milligrams to about 500 milligrams of the compound in admixture with a solid or liquid pharmaceutical carrier or diluent.

A representative formulation suitable for oral administration is a capsule prepared by standard techniques which contains the following:

Ingredient: Parts by weight
2,6-dichloro-m-toluamide _____ 50
Inert filler (lactose, kaolin, starch, etc.) _____ 250

EXAMPLE 1

2,6-dichloro-m-substituted-benzoic acids

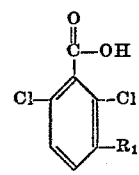

Into a flask equipped with stirrer, dropping funnel, carbon dioxide condenser and gas inlet tube are charged 54.8 g. (0.79 mole) of 2,4-dichlorotoluene and 350 ml. of dry tetrahydrofuran. The system is flushed with dry nitrogen and cooled (carbon dioxide-acetone bath) to an internal temperature of −50° C. A 255 ml. solution of 15% n-butyllithium (0.408 mole n-butyllithium) in hexane is added dropwise into the flask. The resulting dark red-purple solution is maintained at −50° C. for about one hour, and then poured onto a slurry of about 250 g. powdered carbon dioxide and about 100 ml. diethyl ether. After standing for about 20 hours at room temperature, the residue is treated with 250 ml. of 2 N sodium hydroxide. The caustic layer is washed with toluene, acidified with concentrated HCl, extracted twice with 200 ml. of methylene chloride and dried with sodium sulfate. The methylene chloride layer is filtered and the solvent removed in vacuo. The residue is crystallized from 1:1 methanol-water to give 2,6-dichloro-m-toluic acid; M.P. 125°–127° C.

When 2,4-dichloro-allyloxy benzene, 2,4-difluorotoluene, 4-chloro-2-fluorotoluene, 2,4-dichloroanisole or 2-chloro-4-fluorotoluene is used in place of 2,4-dichlorotoluene, in the above process, 3-allyloxy,2,6-dichlorobenzoic acid (M.P. 143°–144° C.), 2,6-difluoro-m-toluic acid (M.P. 139°–140° C.), 6-chloro-2-fluoro-m-toluic acid (M.P. 133°–134° C.), 2,6-dichloro-m-anisic acid (M.P. 145°–147° C.) or 2-chloro-6-fluoro-m-toluic acid (M.P. 116°–117° C.), respectively is obtained.

EXAMPLE 2

2,6-dichloro-m-substituted benzamides

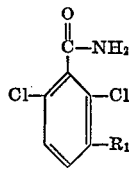

A mixture of 8.2 g. (0.04 mole) of 2,6-dichloro-m-toluic acid, 50 ml. of thionyl chloride and 150 ml. of toluene is stirred and refluxed for 1.5 hours. The excess thionyl chloride is removed with a water pump, and 100 ml. of concentrated ammonium hydroxide (30%) is added dropwise at room temperature. After addition is complete, the reactants are stirred for 16 hours at room temperature. The crude product is filtered off and recrystallized from 1:1 chloroform-pentane. The product obtained is 2,6-dichloro-m-toluamide (M.P. 159°–160° C.).

When 3-allyloxy-2,6-dichlorobenzoic acid, 2,6-difluoro-m-toluic acid, 6-chloro-2-fluoro-m-toluic acid, 2,6-dichloro-m-anisic acid, or 2-chloro-6-fluoro-m-toluic acid is substituted for 2,6-dichloro-m-toluic acid in the above process, 3-allyloxy-2,6-dichlorobenzamide (M.P. 169°–171° C.) 2,6-difluoro-m-toluamide (M.P. 155°–156° C.), 6-chloro-2-fluoro-m-toluamide (M.P. 151°–153° C.), 2,6-dichloro-m-anisamide (M.P. 163°–165° C.), or 2-chloro-6-fluoro-m-toluamide (M.P. 174°–175° C.), respectively is obtained.

EXAMPLE 3

N-methyl-2,6-dichloro-m-substituted-benzamides

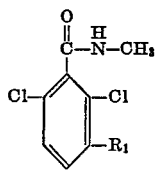

A mixture of 19.5 ml. of 40% methylamine in water, and 20 ml. of distilled water is added dropwise at 25° C. to 2,6-dichloro-m-toluoylchloride prepared from 10.2 g. of 2,6-dichloro-m-toluic acid and 20 ml. of thionyl chloride using the same process as in Example 2 with the exception that 150 ml. of methylene dichloride is used as solvent in place of toluene. After addition is complete, the reactants are stirred for 16 hours at room temperature. The crude product is filtered off and recrystallized from 1:1 methanol-water. The products obtained is N-methyl-2,6-dichloro-m-toluamide (M.P. 190°–191.5° C.).

When 3-allyloxy-2,6-dichlorobenzoic acid, 2,6-difluoro-m-toluic acid, or 6-chloro-2-fluoro-m-toluic acid is used in place of 2,6-dichloro-m-toluic acid, in the above process, N-methyl-3-allyloxy - 2,6 - dichloro-m-benzamide (M.P. 190°–191° C.), N-methyl-2,6-difluoro-m-toluamide (M.P. 123.5°–125° C.) or N-methyl-6-chloro-2-fluoro-m-toluamide (M.P. 153°–154.5° C.), respectively, is obtained.

When an acid chloride is prepared by the process of Example 2 from 11.1 g. of 2,6-dichloro-m-anisic acid and 20 ml. of thionyl chloride using 150 ml. of chloroform as the solvent, and 19.5 ml. of 40% methylamine in water dissolved in an additional 20 ml. of water is added dropwise, the product obtained by the process of this example is N - methyl - 2,6 - dichloro-m-anisamide (M.P. 200°–203° C.).

EXAMPLE 4

N,N-diethyl-2,6-dichloro-m-substituted-benzamide

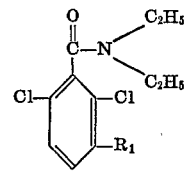

A mixture of 18.5 g. of diethylamine and 75 ml. of distilled water is added dropwise at room temperature to 2,6-dichloro-m-toluoyl chloride prepared from 10.2 g. of 2,6-dichloro-m-toluic acid and 20 ml. of thionyl chloride using the process of Example 2 with the exception that 150 ml. of methylene dichloride is used as solvent in place of the toluene. After addition is complete, the reactants are stirred for 16 hours at room temperature, the crude product is filtered off and recrystallized from 1:1 methanol-water. The product obtained is N,N-diethyl-2,6-dichloro-m-toluamide (M.P. 61°–63° C.).

When 3-allyloxy-2,6-dichlorobenzoic acid or 6-chloro-2-fluoro-m-toluic acid is used in place of 2,6-dichloro-m-toluic acid in the above process, N,N-diethyl-3-allyloxy-2,6-dichlorobenzamide (M.P. 53°–55.5° C.) or N,N-diethyl-6-chloro-2-fluoro-m-toluamide (M.P. 54°–55° C.), respectively, is obtained.

When the acid chloride is prepared by the process of Example 2 from 11.1 g. of 2,6-dichloro-m-anisic acid and 20 ml. of thionyl chloride using 150 ml. of chloroform as the solvent, and 18.5 g. of diethylamine in 75 ml. of water is added dropwise, the product obtained by the process of this example, is N,N-diethyl-2,6-dichloro-m-anisamide (M.P. 95.5°–97° C.).

EXAMPLE 5

2,6-dichloro-m-(2-[1,3-dioxalane])-benzoic acid

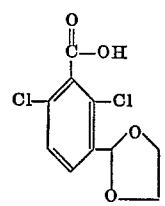

Into a flask equipped with stirrer, dropping funnel, carbon dioxide condenser and gas inlet tube are charged 21.9 g. of 2-(2,4-dichlorophenyl)-1,3-dioxalane and 150 ml. of tetrahydrofuran. The system is flushed with dry nitrogen and cooled (carbon dioxide-acetone bath) to an internal temperature of −50° C. A 75 ml. solution of 15% n-butyllithium in hexane is added dropwise into the flask. The resulting dark red-purple solution is maintained at −50° C. for about one hour and then poured onto a slurry of about 250 g. of powdered carbon dioxide and about 100 ml. of diethyl ether to give 2,6-dichloro-m-(2-[1,3-dioxalane])-benzoic acid.

After standing for about 20 hours at room temperature, the product is treated with 250 ml. of 2 N sodium hydroxide. The caustic extract is separated from the ether layer and acidified with excess 2 N hydrochloric acid. The resulting mixture is stirred for about 3 hours at room temperature, filtered, and crystallized from benzene to give the acid form, 2,6-dichloro-3-formylbenzoic acid (M.P. 136°–138° C.), of the acetal.

EXAMPLE 6

2,6-dichloro-m-formyl-benzamide

A mixture of 6 g. of 2,6-dichloro-m-formyl-benzoic acid, 50 ml. of thionyl chloride and 100 ml. of toluene is stirred and refluxed for about 1.5 hours. The excess thionyl chloride is removed with a water pump and 150 ml. of ammonium hydroxide (30%) is added dropwise at room temperature. After addition is complete, the reactants are stirred for about 16 hours at room temperature. The crude product is filtered off and recrystallized from 1:1 methanol-water. The product obtained is 2,6-dichloro-m-formylbenzamide (M.P. 174°–176° C.).

EXAMPLE 7

2,6-dichloro-α-morpholino-m-toluamide

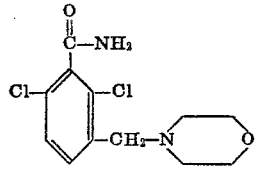

Using the procedure of Example 1, 2,6-dichloro-α-morpholino-m-toluic acid is prepared from 29.5 g. of 1-(2,4-dichlorobenzyl)morpholine dissolved in 200 ml. of tetrahydrofuran and 90 ml. of 15% n-butyllithium in hexane.

The crude acid is converted to the amide by adding 250 ml. of concentrated (30%) ammonium hydroxide dropwise at room temperature to 2,6-dichloro-α-morpholino-m-tolyl chloride prepared by the procedure of Example 2 from 46 g. of 2,6-dichloro-α-morpholino-m-toluic acid and 100 ml. of thionyl chloride using 250 ml. of methylene dichloride as solvent. After stirring for 16 hours at room temperature, the product, 2,6-dichloro-α-morpholino-m-toluamide (M.P. 181°–183° C.), is obtained by recrystallization from 1:1 methylene chloride-methanol.

When 2,4-dichloro-biphenyl, 2,4-dichloro-α-dimethylaminotoluene, 1-(2,4-dichlorobenzyl)thiomorpholine, 4-methyl-1-(2,4-dichlorobenzyl) piperazine, 1-(2,4-dichlorobenzyl)pyrrolidine or 2,4-dichloro-3-(2-diethylaminoethoxy)benzene is used in place of the 1-(2,4-dichlorobenzyl) morpholine in the above process, 2,6-dichloro-m-phenylbenzoic acid, 2,6 - dichloro-α-dimethylamino-m-toluic acid, 2,6-dichloro-α-thiomorpholino-m-toluic acid, 2,6 - dichloro-α-(4 - methyl-1-piperazinyl)-m-toluic acid, 2,6 - dichloro-α-(pyrrolidino)-m-toluic acid or 2,6 - dichloro-m-(2-diethylaminoethoxy)benzoic acid, respectively, is obtained.

When 2,6-dichloro-m-phenylbenzoic acid, 2,6-dichloro-α-dimethylamino-m-toluic acid, 2,6 - dichloro-α-thiomorpholino-m-toluic acid, 2,6-dichloro-α-(4-methyl-1-piperazinyl)-m-toluic acid, 2,6-dichloro-α-pyrrolidinyl-m-toluic acid or 2,6-dichloro-m-(2-diethylaminoethoxy)benzoic acid is treated with thionyl chloride in methylene chloride in place of 2,6-dichloro-α-morpholino-m-toluic acid in the above process and then concentrated ammonium hydroxide is added dropwise at room temperature, there is obtained after stirring for 16 hours and recrystallization from methylene chloride-methanol, 2,6-dichloro-m-phenylbenzamide, 2,6-dichloro-α-dimethylamino-m-toluamide, 2,6-dichloro-α-thiomorpholino-m-toluamide, 2,6-dichloro-α-(4-methyl-1-piperazinyl)-m-toluamide, 2,6-dichloro-α-(pyrrolidino)-m-toluamide or 2,6 - dichloro-m-(2 - diethylaminoethoxy)benzamide, respectively.

What is claimed is:
1. The compound which is 2,6-difluoro-m-toluamide.
2. The compound which is 6-chloro-2-fluoro-m-toluamide.
3. The compound which is 2-chloro-6-fluoro-m-toluamide.
4. The compound which is 2,6-dichloro-m-formylbenzamide.
5. The compound which is N-methyl-2,6-difluoro-m-toluamide.
6. The compound which is N-methyl-6-chloro-2-fluoro-m-toluamide.
7. The compound which is N,N-diethyl - 6 - chloro-2-fluoro-m-toluamide.

References Cited

UNITED STATES PATENTS

| | | | |
|---|---|---|---|
| 3,012,873 | 12/1961 | Richter | 71—118 |
| 3,125,433 | 3/1964 | Kohn | 71—115 |
| 3,463,639 | 8/1969 | Baltazzi | 260—558 D |

OTHER REFERENCES

J. Med. Pharm. Chem. vol. 2, pp. 213–219 (1960), Moffett et al.

Organic Chemistry, Fieser et al., 3rd ed. (1956), p. 558.

HENRY R. JILES, Primary Examiner

S. D. WINTERS, Assistant Examiner

U.S. Cl. X.R.

260—521 A, 559 R, 518 A, 515 A, 340.9, 519, 326.3, 293.77, 239 B, 293.72, 247.2 A, 247.2 R, 243 B, 268 R, 559 A, 558 A, 544 M, 650 F, 650 R, 612 D, 599, 570.7, 570.9, 326.87; 71—90, 92, 94, 95, 88, 115, 118; 424—246, 248, 250, 267, 274, 278, 317, 324